(12) United States Patent
Uegaki (10) Patent No.: US 6,595,076 B2
(45) Date of Patent: Jul. 22, 2003

(54) METHOD OF REPAIRING VEHICLE BODY AND REPAIR INDEXING DEVICE

(75) Inventor: Tateo Uegaki, 2-21, Turugaya 7-chome, Miyagino-ku, Sendai-shi, Miyagi (JP)

(73) Assignee: Tateo Uegaki, Sendai (JP)

( * ) Notice: Subject to any disclaimer, the term of this patent is extended or adjusted under 35 U.S.C. 154(b) by 0 days.

(21) Appl. No.: 10/037,694

(22) Filed: Oct. 19, 2001

(65) Prior Publication Data

US 2002/0058079 A1 May 16, 2002

Related U.S. Application Data

(62) Division of application No. 09/434,003, filed on Nov. 4, 1999, now Pat. No. 6,389,913.

(30) Foreign Application Priority Data

Nov. 5, 1998 (JP) ............................................. 10-315187

(51) Int. Cl.⁷ .............................................. G01B 5/225
(52) U.S. Cl. ..................................................... 73/866.3
(58) Field of Search ................................ 33/600, 501.1, 33/501.11, 501.17, 613, 679.1, 545, 546, 608, 288; 73/866.3, 865.9; 29/407.01, 407.05

(56) References Cited

U.S. PATENT DOCUMENTS

| 4,479,305 A |   | 10/1984 | Wendl et al. |
| 4,507,872 A | * | 4/1985 | Schermann |
| 4,823,469 A |   | 4/1989 | Broselow |
| 5,522,145 A |   | 6/1996 | Chisum |
| 5,644,854 A | * | 7/1997 | Bergeron |
| 5,801,834 A |   | 9/1998 | Danielson et al. |

FOREIGN PATENT DOCUMENTS

FR    2 703 447    10/1994

\* cited by examiner

*Primary Examiner*—Robert Raevis
(74) *Attorney, Agent, or Firm*—Burr & Brown (57) ABSTRACT

The present invention concerns a method of repairing a vehicle body and a repair indexing device for estimating the damage of a vehicle body panel and providing a guide for the repair of the vehicle body. A method of repairing the damage of a vehicle body according to the present invention comprises the steps of: measuring quantitatively the depth of a recessed part caused by the damage; and selecting a method from a plurality of previously estimated processes on the basis of the measured result. The processes are selected from putty filling work and sheet metal work. Further, a repair indexing device for a vehicle body according to the present invention comprises: a plate shaped body; and a gauge body provided at the central part of the plate shaped body so as to be capable of sliding in the direction perpendicular to the longitudinal direction of the plate shaped body; a measuring means provided on the plate shaped body to measure the degree of damage of the vehicle body as the amount of sliding of the gauge body; a method display means for displaying a plurality of processes; and a method selecting means for selecting a method for repairing the damage from the plurality of processes so as to meet the amount of sliding obtained by the measuring means. According to the present invention, the damage of the vehicle body can be quantitatively understood and a proper method of repairing the vehicle can be recognized.

6 Claims, 7 Drawing Sheets

METHOD OF REPAIRING VEHICLE BODY AND REPAIR INDEXING DEVICE

CROSS REFERENCE TO RELATED APPLICATION

This is a divisional application of U.S. Ser. No. 09/434,003 filed Nov. 4, 1999, now U.S. Pat. No. 6,389,913, the entirety of which is incorporated herein by reference.

BACKGROUND OF THE INVENTION

1. Field of the Invention

The present invention relates to a method of repairing a vehicle body and a repair indexing device, and more particularly to a device for providing the estimation of the damage of a vehicle body panel and a guide for repairing the damage.

2. Description of the Related Art

When a breakage (dent) is generated on the body of a vehicle due to the cause of a traffic accident, the vehicle body is generally recovered to its original state in accordance with repairing methods mentioned below.

Specifically, when the degree of the dent is large, the curvature of a steel plate itself needs to be corrected. This work is called sheet metal work. The sheet metal work includes a method of correcting the curvature by striking it out or knocking it out from the back side of an iron plate and a method of correcting the curvature by welding an anchor to the surface of an iron plate by spot welding and drawing it out from the surface of the iron plate. Then, after the sheet metal work, a putty filling process, a painting process of a primer surfacer and a main painting process are successively carried out.

Further, on the other hand, when the degree of the dent is not so large as to apply the sheet metal work thereto, only the processes after the sheet metal work may be carried out. As for the putty filling process, there exist some methods depending on the degree of the dent and the kinds of putty to be used also differ depending on the degree of the dent. Recently, there has been developed a technique for repairing even a considerably severe dent by using special putty.

As described above, since a sheet metal repair needs to be carried out by repairing work corresponding to the degree of the damage, long experience is required for deciding how to carry out the repair. Further, high technical skill is also required for the actual repair work.

However, there are few engineers having such a high level of judgement and technical ability, and particularly, it is unreasonable from an economic point of view to engage such an experienced engineer to repair slight and minor damage.

Thus, an engineer having relatively little experience may be engaged in the repair of slight and minor damage, however, he may not possibly judge what kind of method for repairing the damage is required for actual repair work, which can cause a serious problem.

SUMMARY OF THE INVENTION

The present invention has been made with taking the above described matter into consideration, and accordingly, has an object to provide a method of repairing a vehicle body panel and a repair indexing device by which damage of a vehicle body can be quantatively recognized, the damage can be estimated and recorded with ease and even a person having little experience can properly determine a proper repairing method.

According to a first aspect of the present invention, there is provided a method of repairing the damage of a vehicle body, comprising the steps of: measuring quantitatively the depth of a recessed part caused by the damage; and selecting a process from a plurality of previously estimated processes on the basis of the measured result, wherein the process is selected from putty filling and sheet metal work.

According to a second aspect of the present invention, there is provided a repair indexing device for a vehicle body employed upon repair of the damage of the vehicle body, comprising: a plate shaped body; a gauge body provided at the central part of the plate shaped body so as to be capable of sliding in the direction perpendicular to the longitudinal direction of the plate shaped body; a measuring means provided on the plate shaped body to measure the degree of damage of the vehicle body as the amount of sliding of the gauge body; a method display means for displaying a plurality of processes of a method; and a method selecting means for selecting a method of processes for repairing the damage from the plurality of methods so as to meet the amount of sliding obtained by the measuring means.

According to a third aspect of the present invention, there is provided a repair indexing device for a vehicle body in addition to the second aspect, further comprising: a preliminary measuring means for measuring the normal surface configuration of a vehicle body panel to be repaired; and a correcting means for correcting the reference value of the gauge body on the basis of the measured value obtained by the preliminary measuring means.

According to a fourth aspect of the present invention, there is provided a repair indexing device for a vehicle body in addition to the second aspect, further comprising: a deforming means for bending the plate shaped body in the direction perpendicular to the direction of the thickness of the plate shaped body, wherein the deforming means deforms the plate shaped body so as to correspond to the normal curved surface of the vehicle body panel to be repaired and the measuring means sets the plate shaped body thus deformed to the reference value of the gauge body.

According to a fifth aspect of the present invention, there is provided a repair indexing device for a vehicle body in addition to the fourth aspect, wherein the deforming means has a long plate, peninsular parts respectively extend from both ends of the long plate in the directions perpendicular to that of the long plate and the tip ends of the peninsular parts are connected together by means of a substantially expansible high strength body, and the high strength body is expanded and contracted so that the long plate can be bent perpendicularly and in the direction of its thickness.

According to a sixth aspect of the present invention, there is provided a repair indexing device for a vehicle body in addition to the second aspect, wherein the plate shaped body is provided with a base formed so as to freely slide in the direction perpendicular to the longitudinal direction of the plate shaped body, and the base has auxiliary gauge bodies at both ends thereof so as to freely slide in the directions perpendicular to the longitudinal direction of the base. Further, when the normal curved surface of the vehicle body panel is a protruding or convex surface, the auxiliary gauge bodies are slid to the vehicle body panel side from the base to correct the reference point of the gauge body. Still further, when the normal curved surface of the vehicle body panel is a recessed surface, the plate shaped body is slid to the vehicle body panel side from the base to correct the reference point of the gauge body.

The above described measuring means may be formed as a scale for measuring the amount of sliding of the gauge body. A plurality of methods may be displayed on the scale.

As the plate shaped body, a transparent plate made of a synthetic resin can be employed. The gauge body is preferably made of a synthetic resin. The scale may be preferably scored on the plate shaped body and an adhesive sheet or the like may be used in place thereof.

The method display means describes some specific repair methods. It is desired to divide the scale into some areas and describe the repair methods respectively corresponding to the areas.

Further, the long plate and the peninsular parts are formed with a flexible material such as a synthetic resin so as to be deformable. The high strength body may be preferably formed as a metallic shaft. Then, thread parts are formed in the parts of the high strength body and the connecting parts of the peninsular parts. Thus, the high strength body is rotated so that the length of the high strength body between both the peninsular parts can be expanded and contracted.

Upon use of the repair indexing device with the above described structure, on the assumption that a part subjected to a damage, for example, a dent is generated on the central part of a left door, the same position of a right door having no deformation is first measured so that the amount of the dent of the left door is measured on the basis of the measured result.

Specifically, the plate shaped body is initially deformed so as to correspond to the configuration of the right door which is not subjected to a damage to store the configuration (configuration of a curved surface) of the right door in the plate shaped body. Under this state, the plate shaped body is made to abut on the deformed part of the left door, and then, the gauge body is slid to measure the depth of the dented part. This depth can be directly read on the scale. Further, the methods described adjacently to the scale permit a user to understand the contents of a repair to be carried out.

As described above, the repair indexing device serves to store the normal configuration of a body by deforming the plate shaped body itself. Since the plate shaped body can be freely deformed so that it can readily meet a case in which the normal body is configured with a recessed surface as well as a case in which the normal body is configured with a convexed or protruding surface.

Further, according to the sixth aspect of the present invention, the base and the plate shaped body can slide relative to each other, so that the normal body configuration can be stored.

In other words, when the normal body configuration is provided with a recessed surface, the plate shaped body is moved forward to the body side so as to store the normal configuration. On the other hand, when the normal body configuration is provided with a convexed or protruding surface, the auxiliary bodies are moved forward to the body side so as to store the normal configuration.

In the above described example according to the sixth aspect of the present invention, a measuring method employed in the case of the normal body configuration of the recessed surface is different from that employed in the case of the normal body configuration of the convexed surface.

In both the cases, after the normal body configuration is stored, the plate shaped body is made to abut on the damaged or deformed part, and then, the gauge body is slid to measure the depth of the dent part. This depth can be directly read on the scale. Further, the methods described adjacently to the scale permit a user to understand the contents of a repair to be carried out.

According to the present invention, the degree of the damage of a vehicle body can be quantitatively grasped and a repairing method corresponding to the degree of the damage can be properly recognized.

Further, according to the present invention, the plate shaped body is made to abut on the damaged part after the normal body shape is stored, and then, the gauge body is slid to measure the depth of the bent part, and the damage of the vehicle body can be quantitatively recognized with good accuracy, and the damage can be estimated and recorded with ease.

Still further, even an engineer having little experience can suitably select a suitable repairing method by using the device of the present invention, so that the repair of the vehicle body can be properly and rapidly carried out at low cost.

Other features and advantages of the present invention will be apparent from the following description taken in conjunction with the accompanying drawings.

DETAILED DESCRIPTION OF THE PREFERRED EMBODIMENTS

Now, a method of repairing a vehicle body and a repair indexing device according to the present invention will be described in more detail by way of embodiments shown in FIGS. 1 to 12.

Initially, an explanation will be given to the repair indexing device, and then, the method of repairing a vehicle body will be described at the same time when the procedure for using the repair indexing device is described.

[First Embodiment]

The repair indexing device according to the first embodiment of the present invention will be described by referring to FIGS. 1 to 6 and FIGS. 9 and 10.

Figure 1:
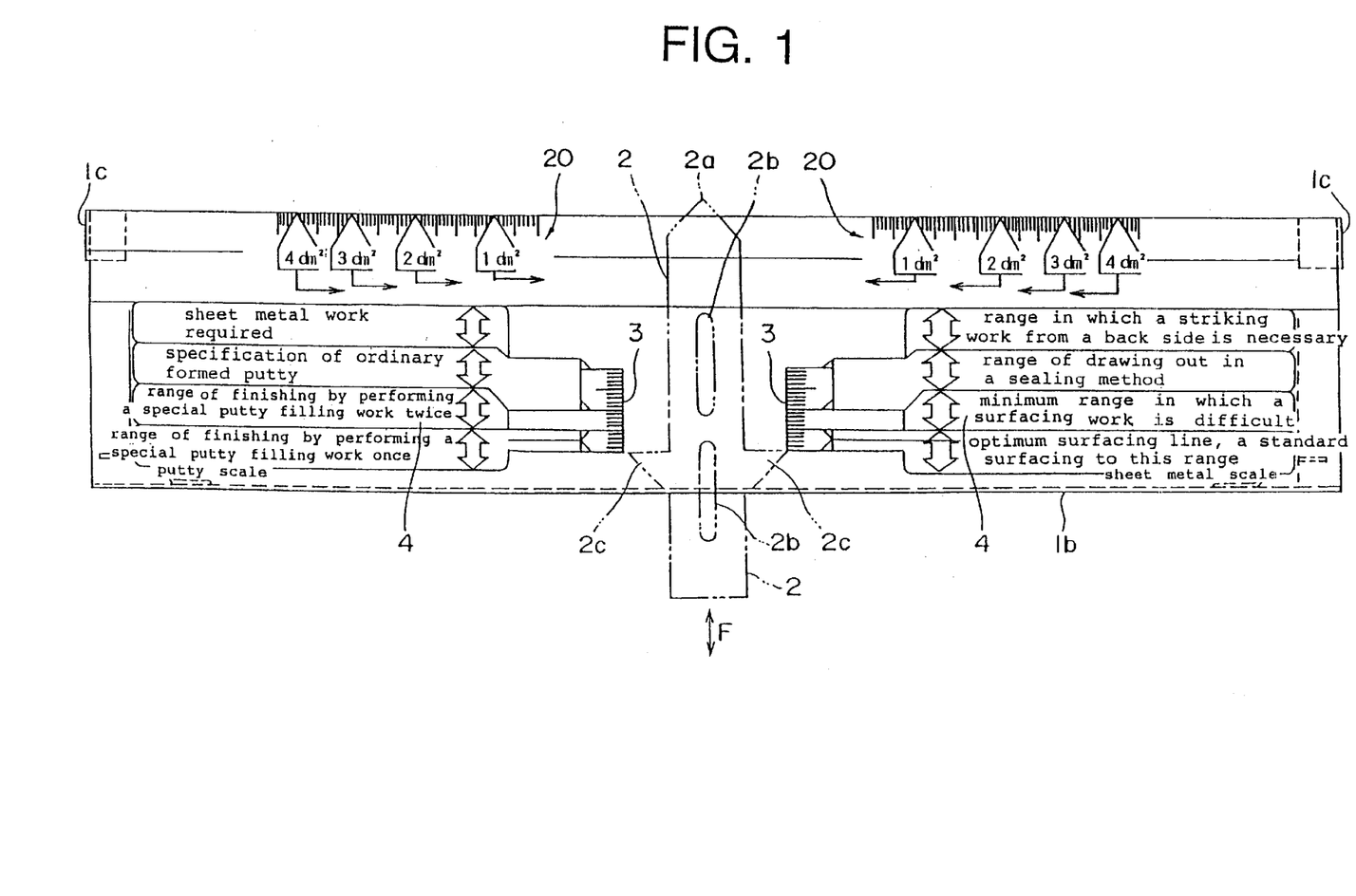
FIG. 1 is a plan view showing a plate shaped plate part of a repair indexing device according to a first embodiment of the present invention.
Figure 2:
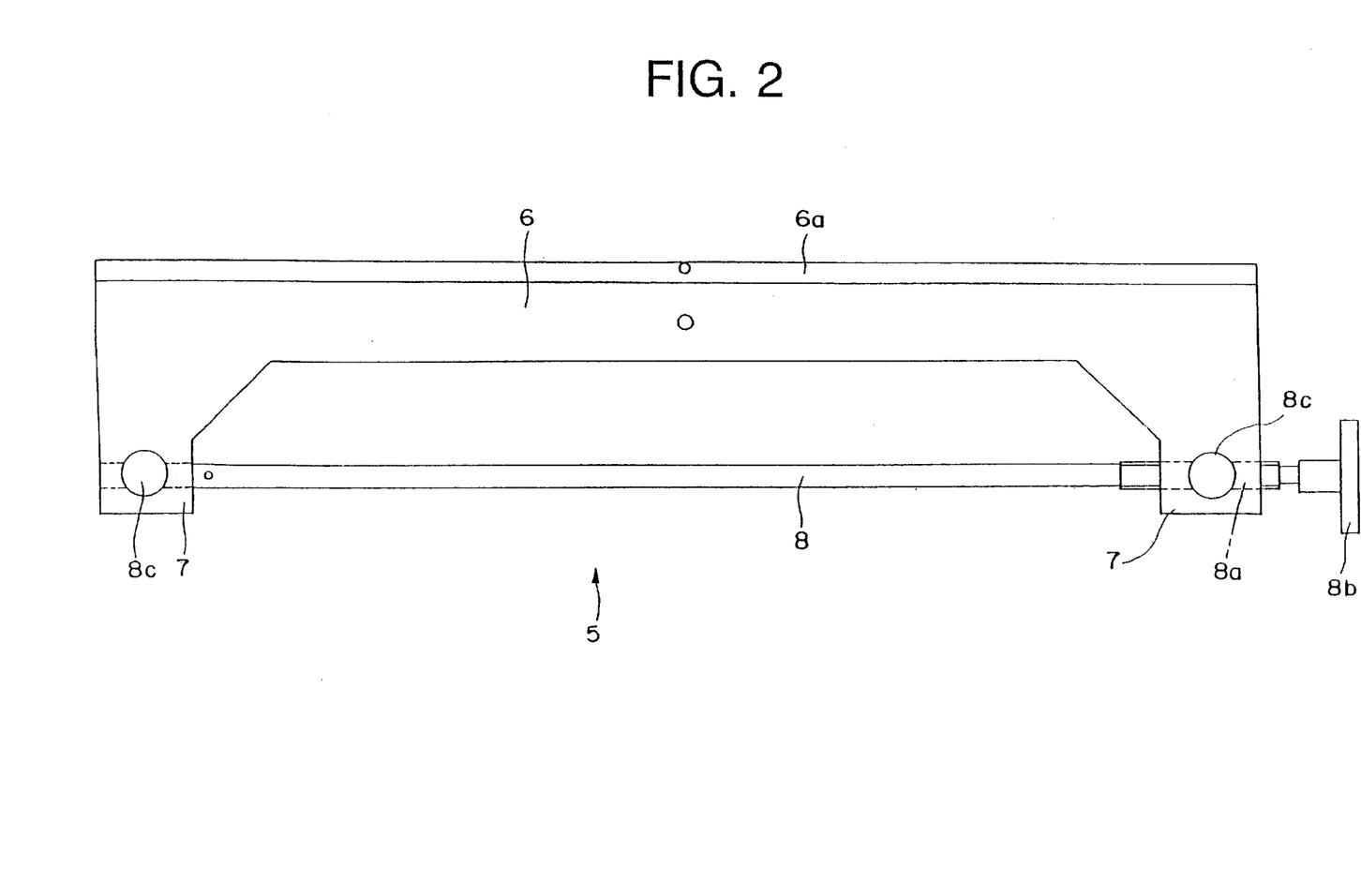
FIG. 2 is a plan view showing a deforming means part of the repair indexing device according to the first embodiment of the present invention.

FIG. 1 shows the entire part of a plate shaped body 1. The plate shaped body 1 is formed with a transparent synthetic resin. A gauge body 2 is provided at the central part of the plate shaped body 1 so as to be capable of sliding in the direction perpendicular to the longitudinal direction of the plate shaped body 1.

Figure 3:
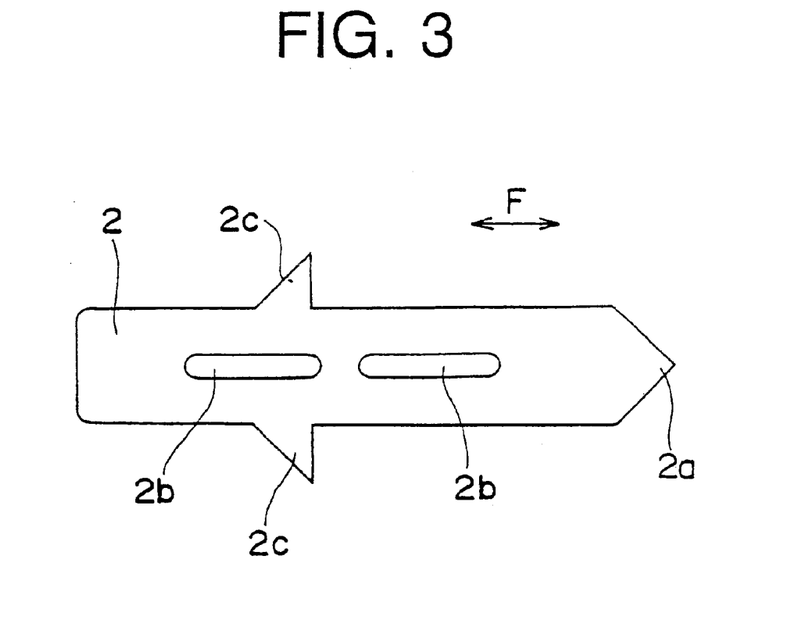
FIG. 3 is a plan view showing a gauge body part of the repair indexing device according to the first embodiment of the present invention.

The gauge body 2 is generally formed in the shape of an arrow mark as shown in FIG. 3. One end of the gauge body is a tip end part 2a and two slots 2b and 2b are provided at the central parts of the gauge body 2. Then, pointers 2c and 2c are formed at both the sides of the main body part of the gauge body 2.

Figure 4:
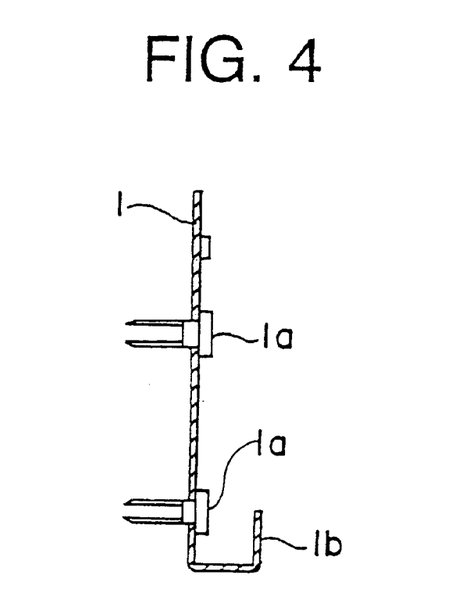
FIG. 4 is a side view showing the plate shaped body part of the repair indexing device according to the first embodiment of the present invention.
Figure 5:
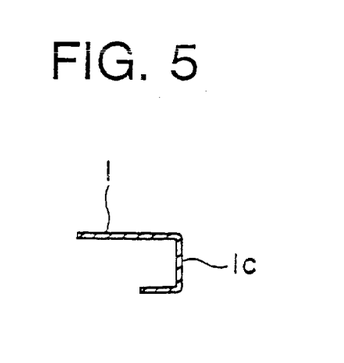
FIG. 5 is a partly sectional view showing the plate shaped body part of the repair indexing device according to the first embodiment of the present invention.

On the other hand, pins 1a and 1a are provided on the plate shaped body 1 as shown in FIG. 4. The above described slots 2b and 2b are loosely fitted to the pins 1a and 1a. Thus, the gauge body 2 is capable of freely sliding in a direction shown by an arrow mark F relative to the plate shaped body 1.

On the surface of the plate shaped body 1, there are scored scales (measuring means) 3 for measuring the amount of sliding of the gauge body 2. The pointers (method selecting means) 2c and 2c correspond to the scales 3, so that a user can see which parts of the scales 3 the pointers 2c and 2c indicate through the transparent plate shaped body 1.

As shown in FIG. 4, on the rear edge of the plate shaped body 1, an engaging part 1b with a U-shape in section is provided. Side engaging parts 1c are provided on both the side edges of the plate shaped body 1.

Further, area display scales 20 and 20 for displaying the length and the area of the damaged part are provided on the front edge of the plate shaped body 1. On the area display scales 20 and 20, there are also provided displays on the basis of decimeter unit. There are displayed 1 square decimeters (10 cm square), 2 square decimeters, 3 square decimeters and 4 square decimeters, successively from the internal side of the scales. The scales are made to abut on the actual damaged part, so that an approximate area (area gained by assuming that the lengthwise length of the damaged part is approximate to the widthwise length thereof) can be calculated.

On the surface of the plate shaped body 1, a plurality of methods (method display means) 4 are displayed so as to correspond to the scales 3. In the methods 4, a "putty scale" and a "sheet metal scale" are independently displayed. The "putty scale" shown in the left side of FIG. 1 comprises four steps of "range of finishing by performing a special putty filling work once", "range of finishing by performing a special putty filling work twice", "specification of ordinary formed putty" and "sheet metal work required".

These steps show that the more the step advances, the more heavy the degree of the damage becomes. As mentioned below, as the amount of protrusion of the gauge body 2 increases (the recessed part becomes deeper), it is more necessary to carry out sheet metal work.

On the other hand, the "sheet metal scale" shown in the right side of FIG. 1 is employed when the body is repaired mainly by sheet metal work without using the above described "putty scale", which is only used as an auxiliary method. The "sheet metal scale" of the methods 4 comprises four steps of "optimum surfacing", "minimum range in which a surfacing is difficult", "range of drawing out by a sealing method" and "striking work from a back side required". These steps also indicate a fact that the more the step advances, the more heavy the degree of the damage becomes. As the amount of protrusion of the gauge body 2 increases, it is more necessary to carry out the sheet metal work.

Here, the sealing method means a method employing a transparent sheet on which a recommended position where the body is to be drawn out is printed. More specifically, when the dent of the body is drawn out, it is not desirable to carry out drawing-out work at random, but it is necessary to carry out the drawing-out work at a plurality of proper positions in order to perform repairing work more rapidly and effectively. For this purpose, the positions where the dent of the body is to be drawn-out are designated by the positions printed on the transparent sheet.

In the plate shaped body 1, is provided a deforming means 5 for bending the plate shaped plate 1 in the direction of its thickness (in the direction of a short side in the rectangular plate shaped body 1) and in the direction perpendicular to the direction of thickness (in the direction of a long side in the rectangular plate shaped body 1). The deforming means has a long plate 6 formed with an elastic synthetic resin. Peninsular parts 7 and 7 extend from both the ends of the long plate 6 in the directions perpendicular to the long plate 6. The ends of the peninsular parts 7 and 7 are connected together by an expansible high strength body 8. The high strength body 8 is provided with a stainless steel rod with a screw 8a cut at its one end and has a thumbscrew 8b attached to one end side. Further, the high strength body 8 is supported by the peninsular parts 7 and 7 by means of cylindrical stoppers 8c and 8c.

Then, the thumbscrew 8b is rotated so that the high strength body 8 can be tensed or stretched, or compressed or reduced from both the sides thereof. In other words, the length of the high strength body 8 between both the peninsular parts 7 and 7 is substantially expanded or contracted. Since the long plate 6 has an elasticity (flexibility), the tension or compression of the high strength body 8 causes the long plate 6 to be bent. The front edge of the long plate 6 is formed in an acute angle part 6a.

Figure 6:
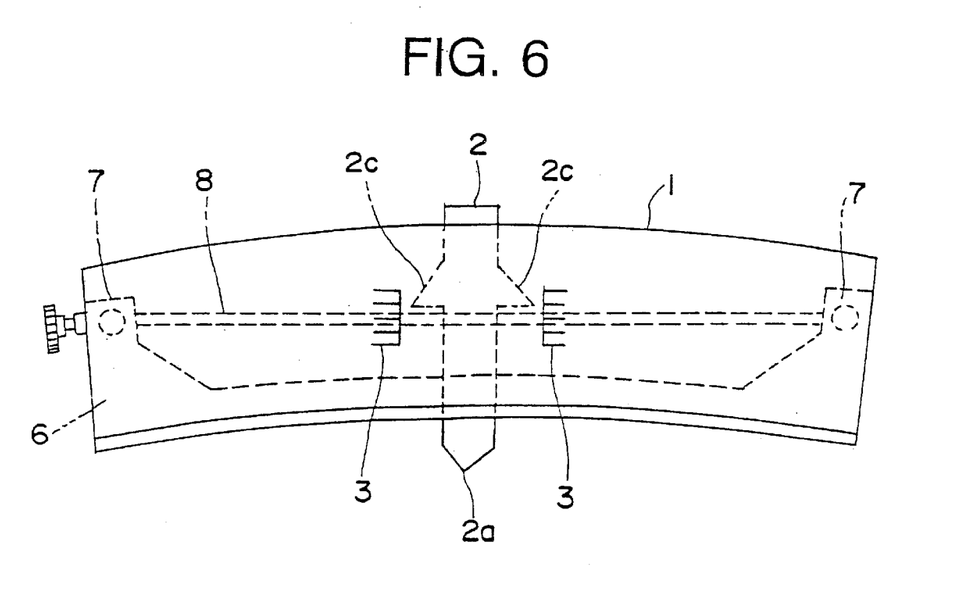
FIG. 6 is a plan view showing the repair indexing device according to the first embodiment of the present invention.

The deforming means 5 having the above mentioned structure is formed integrally with the plate shaped body 1 as shown in FIG. 6. That is to say, the deforming means 5 is held by the engaging part 1b and the side engaging parts 1c so that the deforming means 5 is formed integrally with the plate shaped body 1.

Figure 9:
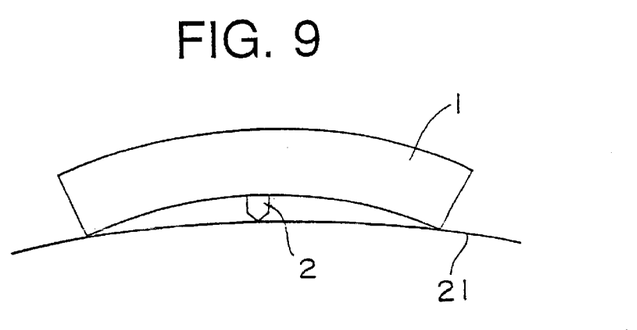
FIG. 9 is a side view of a first state of the procedure for using the repair indexing device according to the first embodiment of the present invention.
Figure 10:
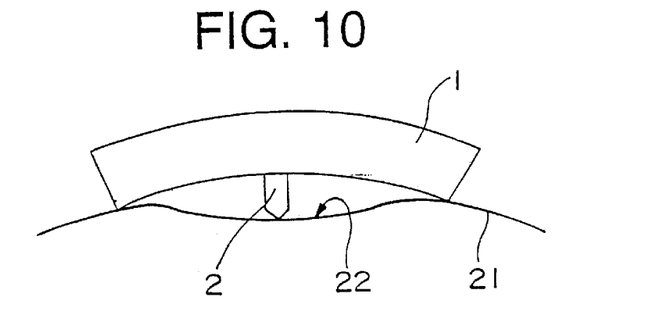
FIG. 10 is a side view a second state of the procedure for using the repair indexing device according to the first embodiment of the present invention.

Accordingly when the deforming means 5 is deformed, the plate shaped body 1 is also deformed in conditions as shown in FIGS. 9 and 10. The deforming means 5 is equivalent to a preliminary measuring means and a correcting means.

Now, a method of using a repair indexing device will be described.

Initially, a normal body configuration needs to be stored in the repair indexing device, because if the normal configuration as a reference cannot be understood, the degree of the deformation of the deformed body cannot be accurately measured.

For this reason, as shown in FIG. 9, the non-deformed (i.e., normal) configuration of the body is stored in a position symmetrical with respect to a position 22 where the body 21 is deformed (for instance, a right door panel with respect to a left door panel). In other words, the plate-shaped body 1 is calibrated by positioning the body 1 on a non-deformed body 21 which is similar in shape to the deformed body, and adjusting the deforming means. In the embodiment shown in FIG. 2, this adjusting is carried out by turning the thumb screw 8b so as to change the length of the distance between the peninsular parts 7 and 7 to a sufficient extent that the pointers 2c are adjusted to point to the position on the scales 3. At this time, the deforming means 5 is adjusted so that three points including the both ends of the plate shaped body 1 and the tip end of the gauge body 2 come into contact with the body 21. Here, the pointers 2c are adjusted so as to point to points 0 of the scales 3. In other words, the dent to be corrected is calibrated to 0 in the normal configuration.

In this connection, the tip end of the gauge body 2 may be set to be flush with the tip ends of the plate shaped body 1. In this case, the curvature of the tip ends of the deformed plate shaped body 1 is identical with the normal configuration (curvature) of the body 21.

Subsequently, as shown in FIG. 10, the repair indexing device is made to abut on the deformed side of the body 21 to push out the gauge body 2 toward the interior of the deformed position 22. Then, the pointers 2c advance on the scales 3 by the amount of pushing out the gauge body 2, hence the amount of the dent of the recessed part can be recognized (the above described operations correspond to a measuring step).

At the same time, the contents of a repair work to be carried out can be grasped in accordance with the descriptions of the methods adjacently to the scales 3 (a selecting step).

The repair indexing device according to the present invention may be reused during the repair work so as to properly obtain a new repair index. Further, the methods in the sheet metal scale side may be combined stepwise with the methods in the putty scale side to carry out the repairing work.

Besides, the gauge body 2 of the repair indexing device is provided at the central part of the plate shaped body 1, because a maximum damage part (an innermost part) of the damaged part is ordinarily located in the central part of the damaged part.

[Second Embodiment]

A second embodiment of the present invention will be described below by viewing FIGS. 7, 8, 11 and 12.

Figure 7:
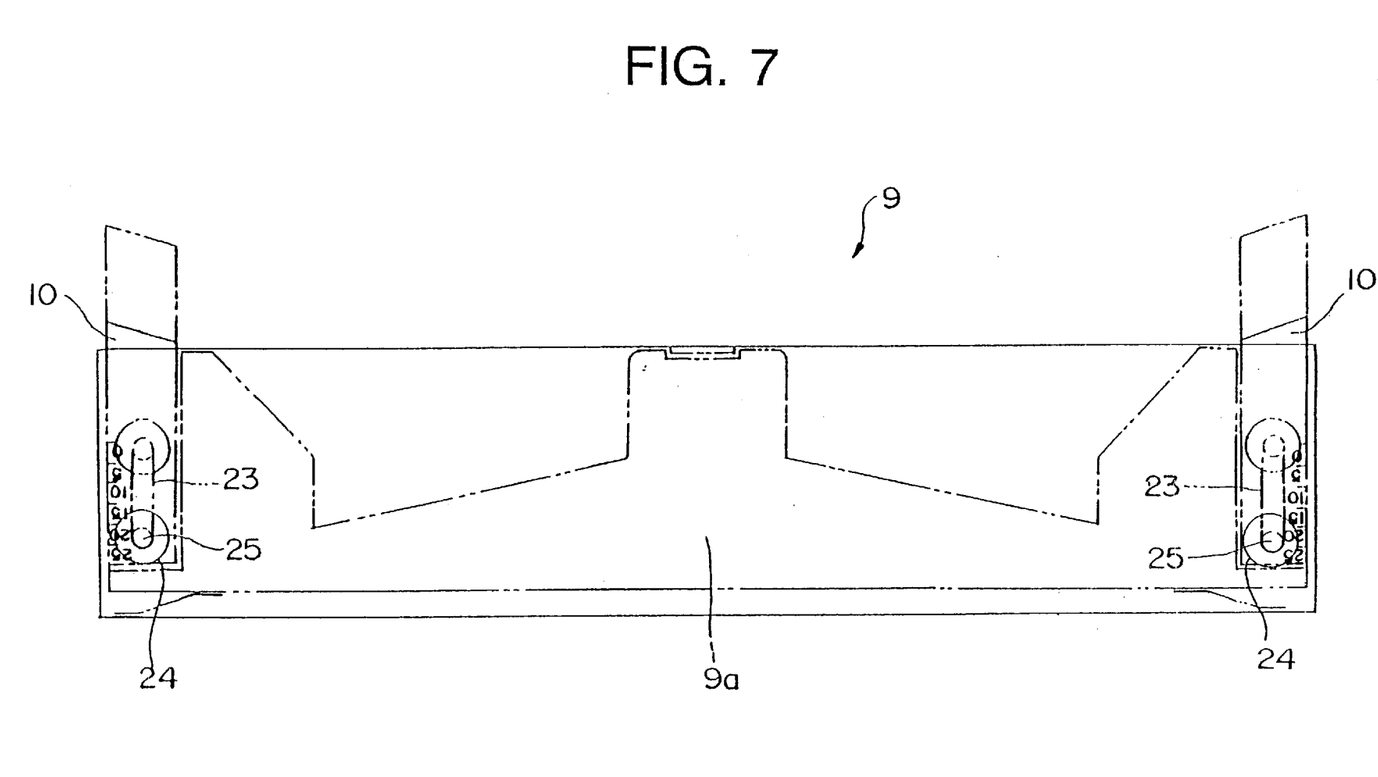
FIG. 7 is a plan view of a base part of a repair indexing device according to a second embodiment of the present invention.
Figure 8:
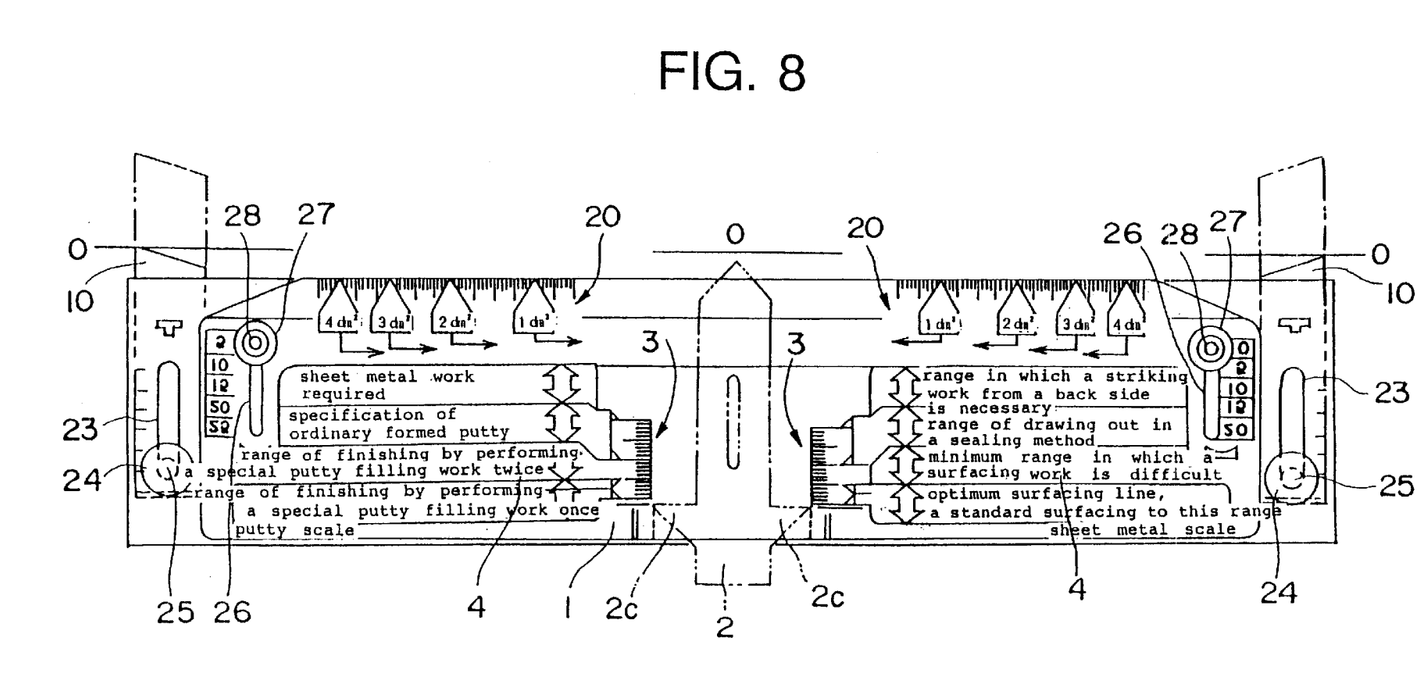
FIG. 8 is a plan view showing the repair indexing device according to the second embodiment of the present invention.

According to this embodiment, a base 9 is added as an additional component to the plate shaped body 1 of the first embodiment. The base 9 is provided with a reinforcing body 9a therein and auxiliary gauge bodies 10 and 10 at both the ends thereof so as to be retractable. The auxiliary gauge bodies 10 and 10 are provided with pins 25. On the other hand, slots 23 and 23 are provided in the base 9. Then, the pins 25 are inserted into the slots 23 and 23 and fixed by means of round nuts 24 and 24. Consequently, the auxiliary gauge bodies 10 and 10 can slide in such a manner as illustrated in FIG. 7.

Then, on the base 9, plate shaped body 1 similar to that in the first embodiment is provided so as to be capable of sliding. The plate shaped body 1 of the second embodiment is different from the plate shaped body 1 of the first embodiment in that slots 26 and 26 are formed in both the sides of the plate shaped body 1 according to the second embodiment. Other structural components of the plate shaped body 1 of the second embodiment of the present invention are identical with those of that of the first embodiment, and therefore, the same reference characters as those of the first embodiment are attached thereto and an explanation thereof will be omitted.

Pins 28 and 28 are formed upright in the base 9 side, inserted through the slots 26 and 26 in the plate shaped body 1 and fixed by means of round nuts 27 and 27.

Subsequently, the procedure for using the repair indexing device according to the second embodiment of the present invention will be described hereinafter.

In this repair indexing device, the base 9 and the plate shaped body 1 can slide in the direction of thickness so as to store a normal body configuration. Measuring methods are different from each other between a case in which the normal body configuration is provided with a recessed surface and a case in which the normal body configuration has a convex or protruding surface.

Figure 11:
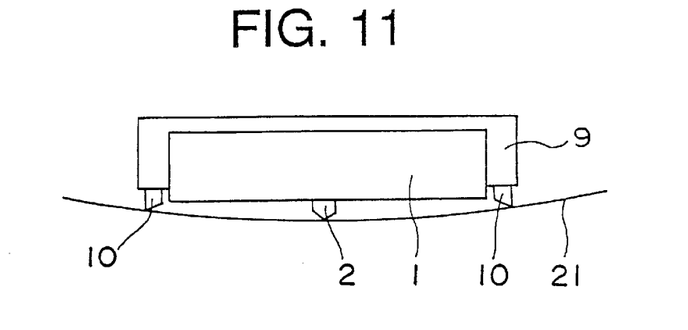
FIG. 11 is a side view of a first state of the procedure for using the repair indexing device according to the second embodiment of the present invention.
Figure 12:
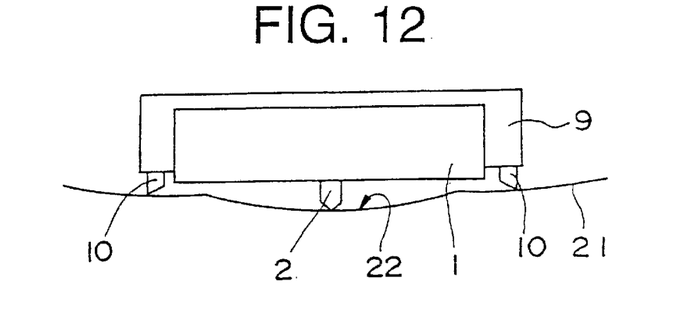
FIG. 12 is a side view of a second state of the procedure for using the repair indexing according to the second embodiment of the present invention.

Initially, a form in which a body 21 is configured so as to have a recessed surface is described by referring to FIGS. 11 and 12. In this case, in the body 21 with the normal configuration as shown in FIG. 11, the plate shaped body 1 is moved toward the body side so that three points including the auxiliary bodies 10 and 10 and the gauge body 2 come into contact with the body 21. Here, pointers 2c are adjusted so as to point to the point 0 of scales 3.

Subsequently, as shown in FIG. 12, while the repair indexing device is made to abut on a deformed part 22, the gauge body 2 is slid to measure the depth of the recessed part.

When the body 21 has a convex surface, while the gauge body 2 is made to abut on the part of the normal body configuration, the auxiliary gauge bodies are pulled/drawn until they abut on the body 21. Thus, the normal body configuration is stored. Then, while the repair indexing device abuts on the deformed part 22, the gauge body 2 is slid to measure the depth of the recessed part.

After the normal body configuration is first stored in such a manner, the plate shaped body 1 is made to abut on the damaged part and then, the gauge body 2 is slid to measure the depth of the recessed part, so that even an operator having relatively little experience can recognize at a glance a correct amount of a dent and a method required for a repair work. Therefore, the necessary putty filling work and the sheet metal work can be rapidly carried out.

It should be noted that the present invention is not limited to the contents of the above described embodiments, and person with ordinary skill in the art can form various kinds of modifications without departing from the gist described in the scope of the claims.

What is claimed is:

1. A method of repairing damage in a vehicle body, comprising the steps of:

measuring quantitatively the depth of a recessed part caused by the damage by placing over said recessed part an indexing device comprising a plate-shaped body and a gauge body, sliding said gauge body in a direction substantially perpendicular to a longitudinal direction of said plate-shaped body to a position where said gauge body is in contact with said recessed part, thereby providing a measured result; and selecting a process for repairing the damage from a plurality of processes displayed on a method display means positioned on said plate-shaped body, so as to meet an amount of said sliding said gauge body in providing said measured result.

2. A method as recited in claim 1, further comprising calibrating said indexing device by placing said indexing device over a non-deformed part and sliding said gauge body in said direction substantially perpendicular to said longitudinal direction of said plate-shaped body to a position where said gauge body is in contact with said non-deformed part.

3. A method as recited in claim 2, wherein said indexing device is calibrated by adjusting a shape of said indexing device such that said gauge body is at a reference position when said gauge body is in contact with said non-deformed part.

4. A method as recited in claim 3, wherein said measured result is obtained by reading a scale identifying a position of said gauge relative to said reference position.

5. A method as recited in claim 2, wherein said non-deformed part has a shape which is similar to a shape of said recessed part prior to having been deformed.

6. A method as recited in claim 2, wherein said non-deformed part is located on a vehicle at a position which is substantially symmetrical to said recessed part with respect to said vehicle.

* * * * *